United States Patent [19]
McFarland, Jr.

[11] 3,783,843
[45] Jan. 8, 1974

[54] INLET MANIFOLD FOR AN INTERNAL COMBUSTION ENGINE

[76] Inventor: James D. McFarland, Jr., 20012 Septo St., Chatsworth, Calif. 91311

[22] Filed: Dec. 13, 1971

[21] Appl. No.: 207,407

Related U.S. Application Data

[63] Continuation-in-part of Ser. No. 130,329, April 2, 1971.

[52] U.S. Cl. .... 123/52 MV, 123/52 M, 123/55 VE, 123/59 PC
[51] Int. Cl. .. F02b 75/18, F02b 75/22, F02b 75/20
[58] Field of Search.................... 123/52 MV, 52 M, 123/55 VE, 59 PC

[56] References Cited
UNITED STATES PATENTS
2,911,967  11/1959  Kiekhaefer.................... 123/52 MV
2,947,293  8/1960  Duntov.......................... 123/52 MV
3,561,408  2/1971  Weiand......................... 123/52 MV

*Primary Examiner*—Wendell E. Burns
*Attorney*—R. Roderick Cline

[57] ABSTRACT

The entrance to each runner of a ram type manifold has a D-shaped cross section with the flat side of the D being along the short wall of the runner. The provision of a flat wall along the short side of the runner simulates a condition where all walls of the runner are of the same length. Consequently there is uniform flow of air and fuel throughout the cross section of each runner.

13 Claims, 3 Drawing Figures

INLET MANIFOLD FOR AN INTERNAL COMBUSTION ENGINE

CROSS-REFERENCE TO RELATED APPLICATION

The present application is a continuation-in-part application of Ser. No. 130,329, filed Apr. 2, 1971.

BACKGROUND OF THE INVENTION

The present invention relates to inlet manifolds for internal combustion engines and, more specifically, to an improvement in inlet manifolds of the high performance type.

A carbureted internal combustion engine employs an inlet manifold to distribute a fuel-air mixture produced by the carburetor into the cylinders of the engine. The mixture is drawn through the manifold and into the combustion chambers of the engine by vacuum created there by piston movement during the suction stroke of each cylinder.

In a V-8 engine there are typically eight inlet ports for the passage of the fuel-air mixture into the eight combustion chambers of the engine. An inlet manifold for a V-8 engine communicates the carburetor with the engine's inlet ports through runners. A runner is a duct or passageway. Typically, the same conditions hold true for engines having different numbers of cylinders than eight.

There are several types of inlet manifolds which are known. Among these are the so-called ram types which are designed to take advantage of negative pressure pulses to augment the driving force which forces the air and fuel mixture in each runner into the runner's associated combustion chamber. Ram type manifolds have independent runners, that is, only one runner serves each cylinder. Typically, a plenum is provided between the inlets to each of the runners and the base of the carburetor or carburetors to provide a source of air and fuel during heavy engine demand and to isolate pressure pulses traveling up the runners towards the carburetor or carburetors.

A good inlet manifold minimizes losses due to friction between the charge going through its runners and the walls of the manifold. Stated in different words, it is obviously highly desirable to minimize the amount of work an internal combustion engine must do to draw its combustible mixture into its cylinders so that the power saved can be used in the output of the engine. At the same time it is very desirable to maintain atomized fuel particles in suspension in the carrying air stream for good distribution within the engine cylinders. It is known that rectangular cross-section runners avoid the problem of air stream vortexing which causes separation of fuel from its carrying air stream and the resulting deleterious effect on performance. It is also known that circular cross section runners avoid eddying at the corners of rectangular cross-section runners which reduces the efficiency of the manifold. In some manifolds it is desirable to have some circularity at the entrance to the runners to carry through the shape of the air and fuel coming from the carburetor and reduce adverse entrance effects.

SUMMARY OF THE INVENTION

The present invention improves the flow characteristics of a circular cross-section runner by evenly distributing the flow energy of the air and fuel mixture throughout each runner's cross section. It is also thought that the present invention provides a runner cross-section geometry which has the advantages of the circular cross section in avoiding the entrance losses and, at least to some extent, the eddy losses, both of which are associated with rectangular cross-section runners while preserving the advantages of the rectangular cross section insofar as fuel separation is concerned.

Specifically, the present invention provides in an independent runner manifold of the type having curved runners a runner cross-section geometry which is characterized by a D-shaped cross section at the entrance to the runner with the flat portion of the D being the wall of the shortest length wall of the runner. It has been found that by providing the shortest wall as a flat wall, the balance of the entrance portion of the runner can be made generally circular to retain the advantages associated with circular cross-section runners, while improving the flow through the runner by making it more uniform. In other words, the fuel and air mixture going through a runner with the geometry of the present invention has generally uniform flow characteristics throughout any cross section of the runner. This provides for good fuel retention in the runner air stream and low losses due to friction between the air-fuel stream and the walls of the runner. By providing a D-shaped cross section with the flat portion of the D being the wall of the shortest side of the runner, the effect seems to be quite similar to extending the short wall to make its length approach the length of the longer walls of the runner.

A more specific form of the present invention contemplates a manifold of the ram type having independent runners which curve downwardly and outwardly from a longitudinal centerline of the manifold, and a plenum mounting plane to register with individual ports of the internal combustion engine with which the manifold cooperates. Each of the runners has a D-shaped entrance from the plenum with the flat portion of the D being on the outside or short wall of the runner. The entrance to each of the runners is at the plenum mounting plane and essentially horizontal. The exit from the runners is at an angle corresponding to the angle of the bank of each cylinder bank of the engine, for example, 30°. The exit from each runner is usually rectangular to match the geometry of the inlet port with which the runner mates. However, circular cross-sectional exits would be used with circular cross-section inlet ports. In the case of rectangular cross-sectional exits, the transition from the D-shaped cross-sectional geometry of each runner to the rectangular section is done gradually so as not to present any restrictions to fuel and air flow. The runners are held together on a base, which includes mounting flanges for the manifold, a crossover passage for engine cooling water, a distribution mount and the like. Along the mounting flanges of the manifold, holes are provided to accept the fastening means for mounting the manifold to the engine. The entrance to the runners at the plenum mounting plane is preferably in two sets of four entrances each corresponding to a V-8 engine, with each set positioned for appropriate communication with a four-barrel carburetor. A spar or the like preferably connects the runner entrances.

These and other features, aspects and advantages of the present invention will become more apparent from the following description, appended claims and drawings.

DESCRIPTION OF THE PREFERRED EMBODIMENTS

Figure 1:
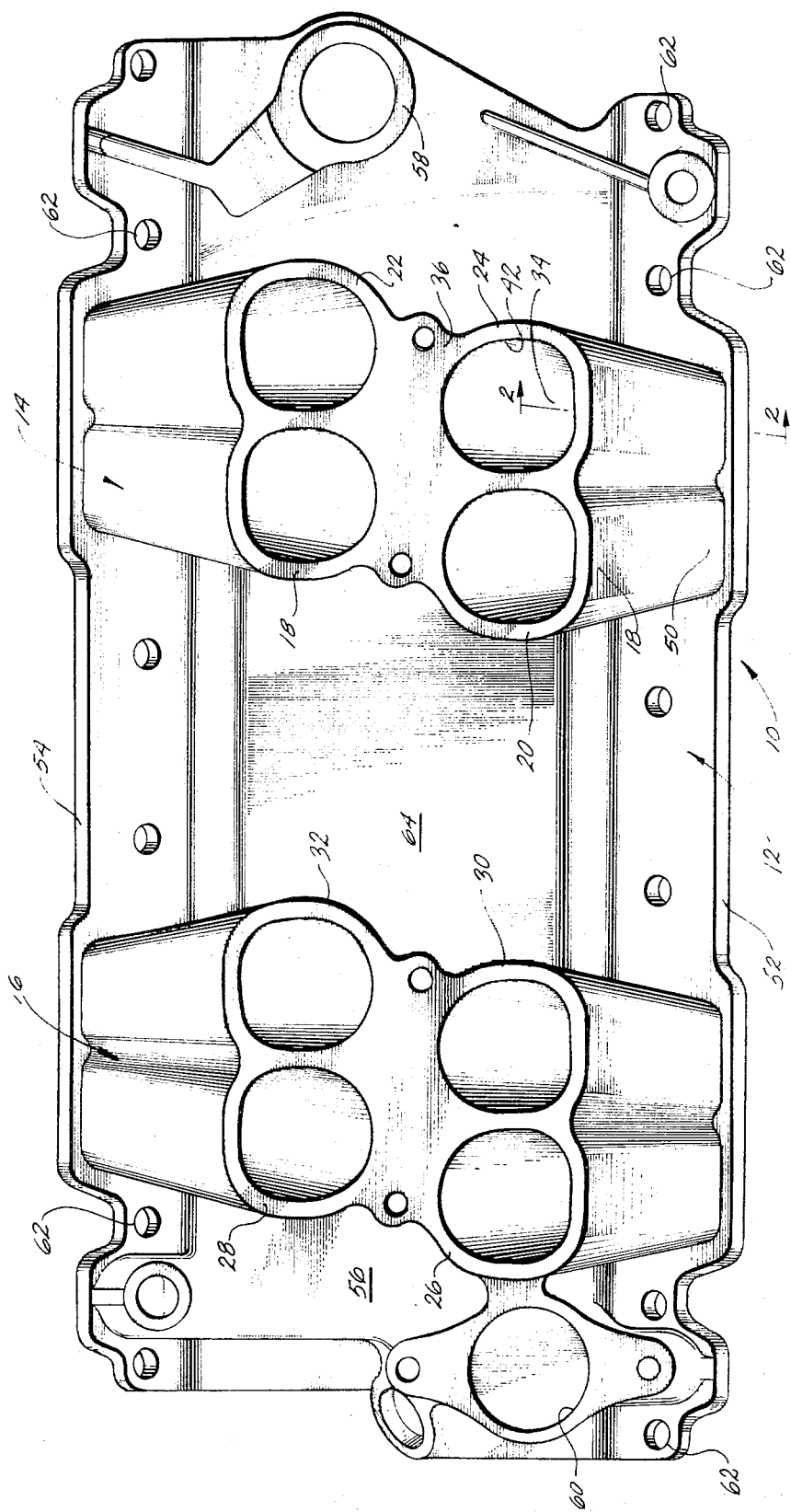
FIG. 1 is a plan view of the top of a presently preferred embodiment of the improved manifold of the present invention.

With reference to FIG. 1, an improved independent runner manifold 10 is shown in plan. The manifold includes a base 12 and two sets of four independent runners 14 and 16. Specifically, runner set 14 has independent runners 18, 20, 22 and 24, while runner set 16 has independent runners 26, 28, 30 and 32.

The longitudinal centerline of the manifold corresponds to the longitudinal centerline of the engine. It should be noted that the runners on one side of the centerline are offset longitudinally from runners on the opposite side of the centerline. This staggering corresponds to the staggering between the cylinder banks of the engine with which the engine manifold is used.

Each runner is responsible for directing a fuel and air mixture into a cooperating one of the combustion chambers of an internal combustion engine. An independent runner manifold is distinguished from other manifolds by the fact that no cylinder shares a runner, in whole or in part, with another cylinder. The fuel and air mixture emanates from a pair of carburetors mounted over a plenum (not shown). The plenum serves as a reserve volume for high demand requirements of an engine and, in addition, serves as a shock chamber to prevent pressure pulses coming up the runners from the engine from reaching the carburetor and producing standoff, a condition manifested by a cloud of atomized gasoline and gasoline vapor over the carburetor.

Obviously, it is highly desirable to introduce into each cylinder of an internal combustion engine a well mixed charge of fuel and air and to have the same desired fuel-to-air ratio in each cylinder. If this goal is achieved, optimum engine performance can be obtained with the result of more economy, power and less pollutants in exhaust gas emissions. One of the problems in achieving this goal is that gasoline is not fully vaporized at the temperatures at which it is inducted into an internal combustion engine. It is present in a fuel-air charge as vapor, liquid, and fine particles of atomized fuel. The vapor portion presents little problem. The liquid gasoline tends to travel along the walls of a runner into a cylinder through the action of the air stream passing over it and, to some extent, by gravity. Even distribution of the liquid portion between cylinders is difficult to obtain, but independent runner manifolds are effective to promote even inter-cylinder distribution. Atomized fuel is entrained in the air stream and introduced into the combustion chamber with a minimum of separation from the air stream in a well designed manifold. Separation, however, does occur through centrifugal force of the fuel going around corners, and, aside from centrifugal force, insufficient velocity to keep the atomized fuel in suspension.

In an attempt to improve on fuel distribution and entrainment in the carrying air stream, attempts in the past have been made to increase the velocity of the air stream in each runner. This is typically done by reducing the cross-sectional area in each runner which is available for gas and air flow. One of the problems here, however, is that the velocity of the fuel-air stream cannot be increased too much before there is a loss in the amount of charge introduced into the engine, that is, without choking the charge. Moreover, the higher the velocity of atomized fuel in the air stream, the more susceptible the fuel is to separation because of centrifugal force.

In well designed manifolds it is not uncommon to provide in each runner a continuously diminishing cross-sectional area from the runner's inlet to its outlet. This facilitates a good transition for the fuel-air charge leaving the plenum or carburetor and entering the mouth of each runner and, in addition, provides some assurance against boundary layer separation along the walls of a runner inasmuch as the velocity gradient is positive along the length of a runner.

A manifold should, as well, be efficient, that is, not contribute to the pumping work required by the engine by high frictional losses of the fuel-air stream passing through it against the walls of the manifold.

The particular runner configuration of the present invention provides a manifold which is highly efficient and which does not produce excessive separation to atomized fuel from the air stream.

Each of the runners illustrated in FIG. 1 is essentially identical and as a consequence this description will be limited to the detailed description of one runner.

In FIG. 1, runner 24 of runner set 14 has an entrance 34 opening at a generally horizontal surface 36 upon which a plenum or air box is to be mounted. The entrance is in communication with the plenum to receive a fuel and air charge. The entrance is also D-shaped with the flat side or wall of the D, indicated explicitly by reference numeral 38, paralleling the longitudinal centerline of the manifold and being on the far side of the runner from the longitudinal centerline. Generally, laterally extending walls 40 and 42 of the runner meet the flat side of the D and are thenselves somewhat flat but merge into an arc-shaped wall 44 which faces the flat portion of the D and is closest to the longitudinal centerline of the manifold. The reason for arc-shaped wall 44 is that it is thought that in some applications provision of a rounded or arc-shaped section improves the transitional flow between the carburetor and the runner inasmuch as the carburetor throat itself is round.

Figure 2:
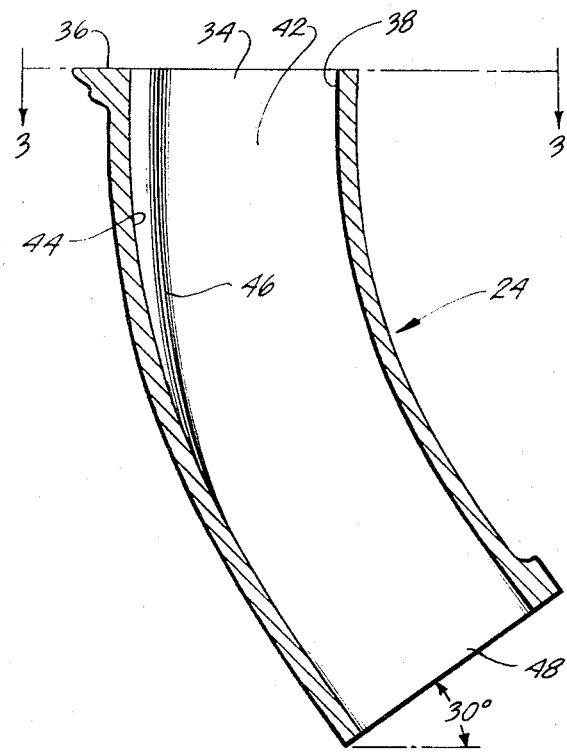
FIG. 2 is an elevational sectional view taken along line 2—2 of the FIG. 1 embodiment.

As is seen in FIG. 2, wall 38 is shorter in extent than the wall it faces: curved wall 44. It is believed that by flattening the shorter wall the flow characteristics across any given cross section of the runner is made more even than that which would occur if the runner cross section were entirely circular. With achievement of more even fuel and air flow, separation of fuel from the air stream is reduced and friction losses are also reduced.

At the entrance to runner 24 and for a good deal of the length of the runner, wall 44 is arcuate but with progressively diminishing curvature. This is seen in FIG. 2 where line 46 represents the fairing of wall 44 into straight wall 42. The maximum distance between wall 38 and wall 44, measured normal to the axis of runner 24, is essentially constant throughout the length of the runner. The length of wall 38 is much shorter than wall 44 and shorter than walls 40 and 42. The exit from runner 24, indicated by reference numeral 48, is at an angle to the horizontal corresponding to the angle of the cylinder bank with which the manifold registers.

Figure 3:
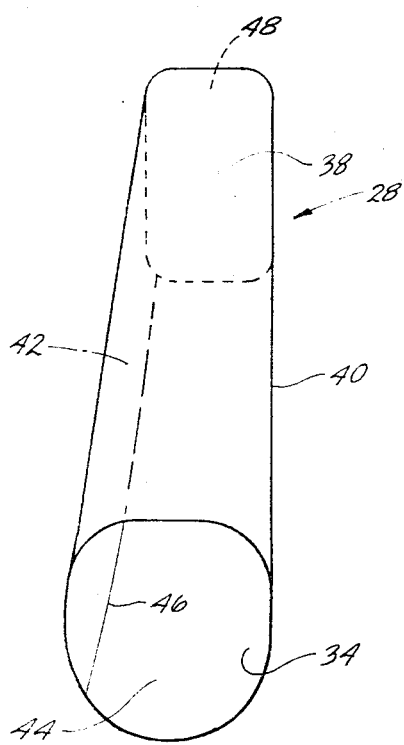
FIG. 3 is a plan view of the surfaces of the runner in the view of line 3—3 of FIG. 2 showing in detail the runner's geometry.

With specific reference to FIG. 3, it is seen more clearly that the D-shaped cross section at entrance 34 of runner 24 progressively changes to a rectangular cross section at exit 48 of the runner. This rectangular cross section corresponds to the cross section of the entrance to the port of the internal combustion engine and is oriented to register with the port. The transition in cross section shape of the runner is gradual and progressive to avoid flow restrictions. The cross-sectional area in the runner progressively diminishes from entrance or mouth 34 to exit 48 in order to achieve a positive velocity gradient along the length of the runner and to provide an orderly transition between the relatively large space above the mouth of the runner to the relatively confined space in the inlet port of the engine.

It should be noted in FIG. 1 that the shared wall of each runner pair is in a plane normal to the longitudinal axis of the manifold. Specifically with reference to runner pairs 18 and 24, shared wall 40 between them extends normal to the longitudinal axis of manifold 10. The outer lateral walls of the runners, however, converge inwardly towards the plane of the common wall. Thus wall 42 of runner 24 and an outer lateral wall 50 of runner 18 converge towards wall 40 in the direction beginning at the entrance to the runners and extending towards the exit from the runners. As previously mentioned, the lateral, normal dimension of a runner between the entrance and the exit, however, at the widest point of the cross section remains essentially constant as is evident in FIG. 2. Thus, the diminution of cross-sectional area of each runner is accomplished primarily by the convergence of the outer walls thereof towards the plane of the common wall and, on the other hand, is tempered by the gradual squaring of the D cross section of the runner from its mouth to its exit.

Completing the description of the manifold, base 12 has a pair of mounting flanges 52 and 54 for mounting the manifold to the cylinder heads of the internal combustion engine with which the manifold is used. The mounting flanges are at an angle to the horizontal for proper registration with the cylinder heads. The exits from the runners open at the external face of the flanges. The base also includes the crossover passage 56, a distributor mount 58, and a water hose mount 60, as well as other well known appurtenances such as manifold mounting holes 62. A spar 64 extends between runner sets 14 and 16 to provide rigidity.

The present invention has been described with reference to certain preferred embodiments. The spirit and scope of the appended claims should not, however, necessarily be limited to the foregoing description.

What is claimed is:

1. An intake manifold for an internal combustion engine, the manifold having a plurality of runners for the passage of an air-fuel mixture from a source thereof into the internal combustion engine, each of the runners having a curvature in a vertical plane to effect a directional change of a fuel-air charge passing therethrough from essentially a vertical orientation to an orientation at a distinct angle to the vertical, and each of the runners having walls of unequal length with the shortest wall facing the longitudinal centerline of the manifold, the improvement comprising:

a D-shaped cross section at the entrance of each runner extending for a predetermined distance along the length of each runner with the flat side of the D being on the short wall of the runner.

2. The improvement claimed in claim 1 wherein the D-shaped cross section gradually changes into a rectangular cross section as the exit to each runner is approached.

3. The improvement claimed in claim 1 wherein the passage defined by each runner progressively narrows from the entrance of the runner to its exit.

4. The improvement claimed in claim 1 wherein each set of runners comprises two pairs of side-by-side runners with each pair of runners sharing a common wall between them, the common wall lying in a plane normal to the longitudinal axis of the manifold.

5. The improvement claimed in claim 1 wherein the lateral walls of the runners at the longitudinal extreme of each runner pair converge towards each other from the mouth of the runner to its exit to progressively narrow the flat side of the D in the direction of the runner exit.

6. The improvement claimed in claim 2 wherein the passage defined by each runner progressively narrows from the mouth of the runner to its exit.

7. The improvement claimed in claim 6 wherein each set of runners comprises two pairs of side-by-side runners with each pair of runners sharing a common wall between them, the common wall lying in a plane normal to the longitudinal axis of the manifold.

8. An improvement in an intake manifold for an internal combustion engine of the ram type and which has two sets of four independent runners for each of eight cylinders to be supplied with fuel, each of the runners curving downwardly and outwardly, respectively, from surfaces of the manifold onto which a plenum is mounted and from a plane extending through the longitudinal centerline of the manifold to a runner exit disposed to register with an inlet port of the engine, the improvement comprising:

a runner cross section in the shape of a D, the flat side of the D paralleling the longitudinal centerline of the manifold and being laterally the most remote side of the runner from such centerline.

9. The improvement claimed in claim 8 wherein the D-shaped cross section gradually changes into a rectangular cross section as the exit to each runner is approached.

10. The improvement claimed in claim 8 wherein the passage defined by each runner progressively narrows from the entrance of the runner to its exit.

11. The improvement claimed in claim 8 wherein each set of runners comprises two pairs of side by side runners with each pair of runners sharing a common wall between them, the common wall lying in a plane normal to the longitudinal axis of the manifold.

12. The improvement claimed in claim 10 wherein the D-shaped cross section gradually changes into a rectangular cross section as the exit to each runner is approached.

13. The improvement claimed in claim 12 wherein each set of runners comprises two pairs of side-by-side runners with each pair of runners sharing a common wall between them, the common wall lying in a plane normal to the longitudinal axis of the manifold.

* * * * *